G. E. SANDBECK.
SLICING MACHINE.
APPLICATION FILED AUG. 18, 1920.

1,381,091.

Patented June 7, 1921.
3 SHEETS—SHEET 1.

INVENTOR
GUSTAF E. SANDBECK
BY
ATTORNEY.

G. E. SANDBECK.
SLICING MACHINE.
APPLICATION FILED AUG. 18, 1920.

1,381,091.

Patented June 7, 1921.
3 SHEETS—SHEET 2.

INVENTOR
GUSTAF E. SANDBECK
BY
HIS ATTORNEY.

G. E. SANDBECK.
SLICING MACHINE.
APPLICATION FILED AUG. 18, 1920.

1,381,091.

Patented June 7, 1921.
3 SHEETS—SHEET 3.

INVENTOR
GUSTAF E. SANDBECK
BY
HIS ATTORNEY.

UNITED STATES PATENT OFFICE.

GUSTAF E. SANDBECK, OF NEW YORK, N. Y.

SLICING-MACHINE.

1,381,091.  Specification of Letters Patent.  Patented June 7, 1921.

Application filed August 18, 1920. Serial No. 404,385.

*To all whom it may concern:*

Be it known that I, GUSTAF E. SANDBECK, a subject of the King of Sweden, residing at New York city, in the county of New York and State of New York, have invented certain new and useful Improvements in Slicing-Machines; and I do hereby declare the following to be a full, clear, and exact description of the invention, such as will enable others skilled in the art to which it appertains to make and use the same.

This invention relates to new and useful improvements in slicing machines especially adapted for slicing bread, cheese, and other similar foods, and has for its primary object the provision of means for firmly supporting the food while being severed and which has associated therewith a movably mounted cutting means that may be easily and quickly actuated.

Another object of this invention is the provision of a cutting frame movably mounted on the supporting means and has means whereby any number of knives may be attached thereto, so that various numbers of slices may be cut in a single operation of the device.

A further object of this invention is the provision of a slicing machine of the above stated character which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1:
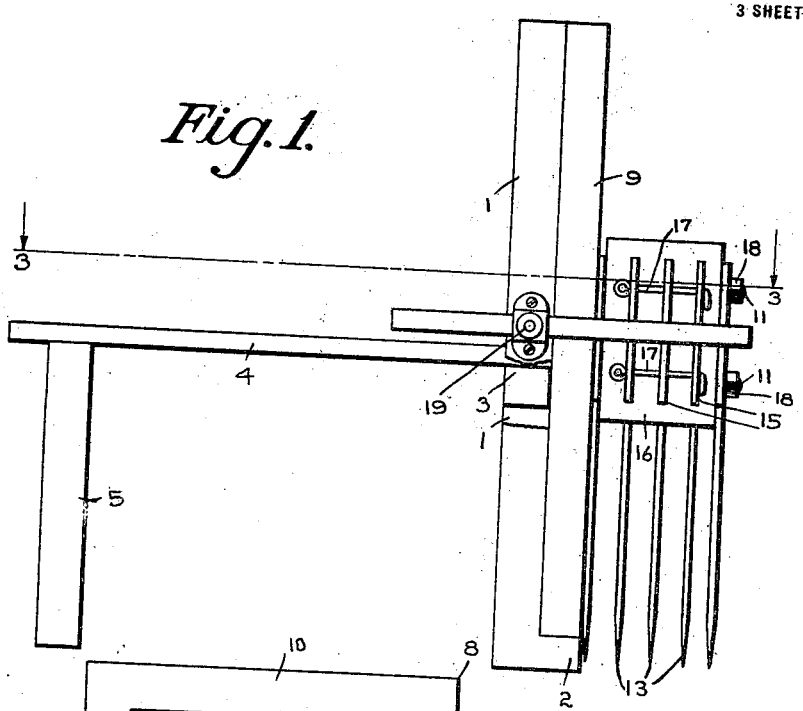
Figure 2:
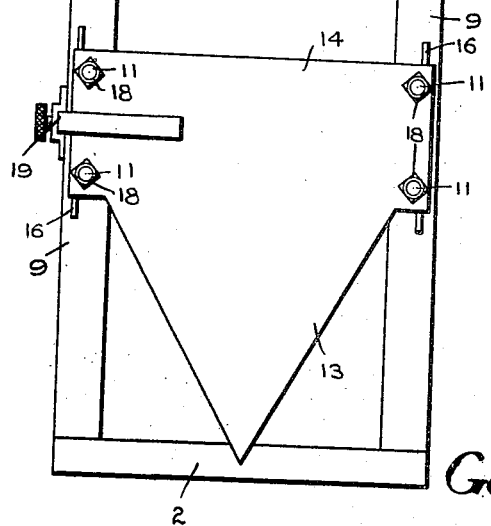
Figure 3:
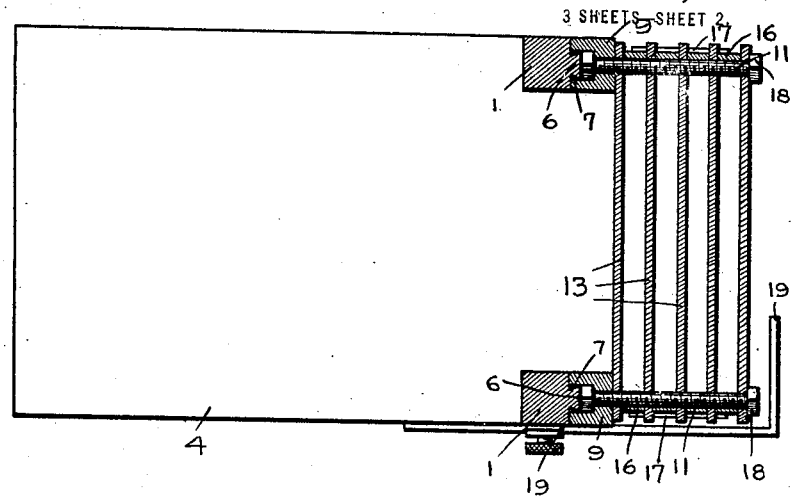
Figure 4:
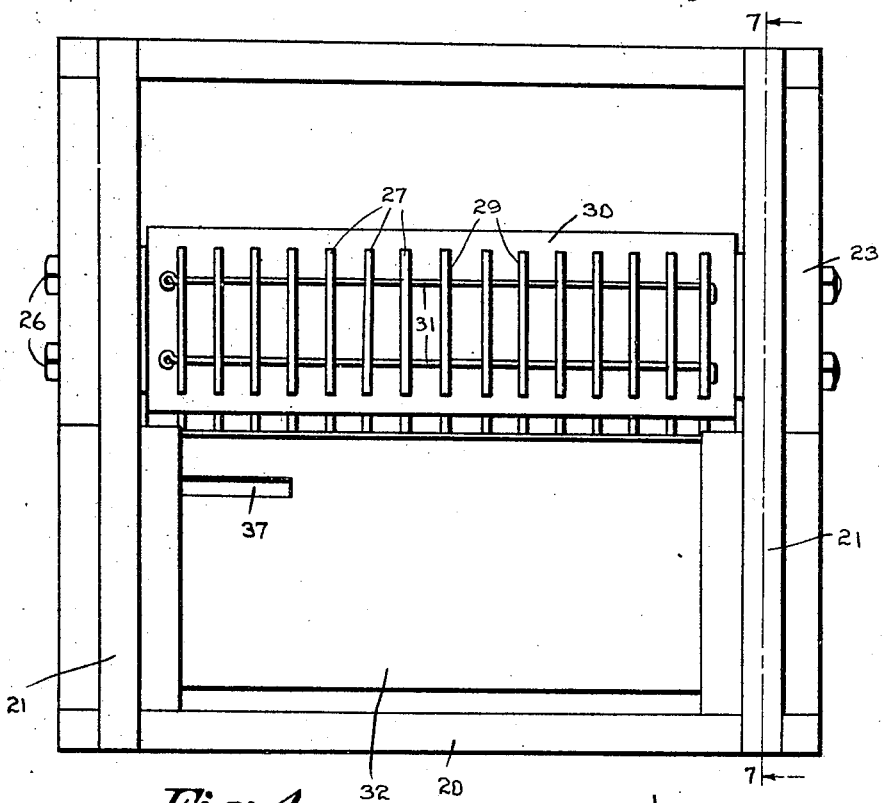
Figure 5:
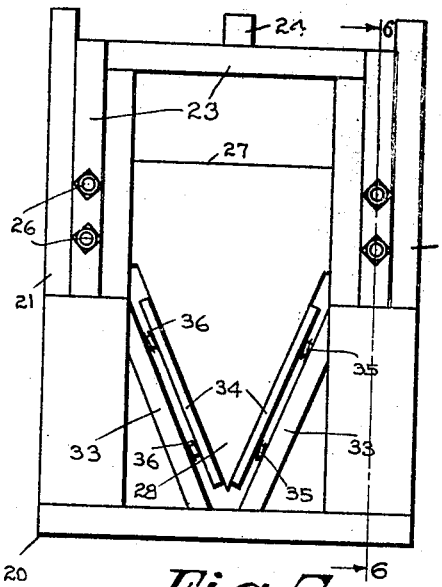
Figure 7:
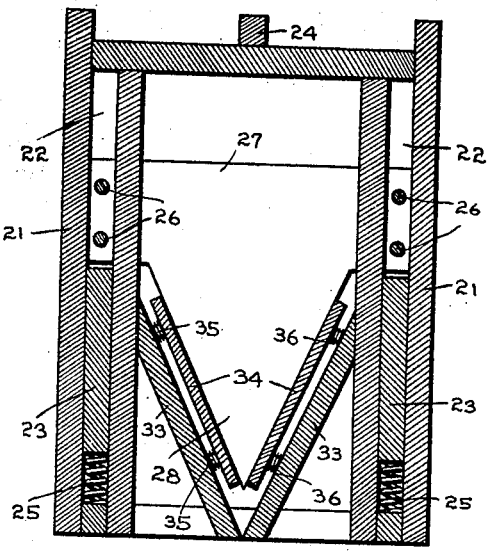
Figure 6:
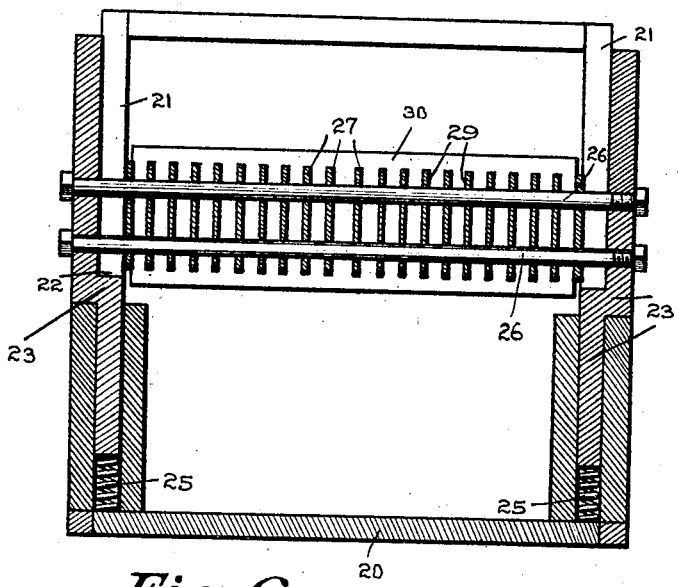

Figure 1 is a side elevation illustrating a slicing machine constructed in accordance with my invention, Fig. 2 is a front elevation illustrating the same, Fig. 3 is a longitudinal sectional view illustrating the mounting of the knives on the supporting means, Fig. 4 is a side elevation illustrating a modified form of my invention, Fig. 5 is a front elevation of the same, Fig. 6 is a longitudinal sectional view illustrating the same, Fig. 7 is a transverse sectional view illustrating the same.

Referring in detail to the drawings, the numeral 1 indicates a vertically disposed supporting frame of substantially rectangular shape and has the lower end member 2 of an increased width to form a combined supporting base and stop. A transversely extending member 3 is secured to the frame 1 and supports one end of a table 4. The table 4 is disposed horizontally and has its other end supported by legs 5. The food to be sliced is placed on the table 4 and is projected through the frame 1. The frame 1 has formed on the outer faces of the vertical members thereof tenons 6 adapted to fit within dove-tailed grooves 7 formed in a knife supporting frame 8. The frame 8 consists of side members 9 and an upper end member 10 which is adapted to form a finger or hand grip for sliding the frame 8 on the frame 1. The frame 8 is limited in its downward movement by the stop 2. The frame 8 has pairs of supporting rods 11 secured to the side members thereof and are adapted to pass through openings 12 formed in knife blades 13. The knife blades 13 are of substantially triangular shape having their apexes disposed downwardly and sharpened and also have the converging edges of the triangle sharpened to form cutting edges. The heads 14 of the knife blades 13 are of elongated formation and have their ends project beyond the triangular shaped portions of said knife blades and are received in slots 15 of spacing elements 16. If desired, tie rods 17 may pass through the ends of the heads 14 after passing through the spacing elements 16. The spacing elements are adapted to retain the knife blades 13 in spaced relation to each other and are also adapted to regulate the thicknesses of the slices 7 from the food. The rods 11 are screw threaded and receive the nuts 18 to retain the knives on said rods and permit the removal of said knives whenever desired.

A gage 19 is adjustably secured to the frame 1 and extends forwardly and transversely of said frame and is adapted to be engaged by the end of the food which is to be sliced so as to regulate the thickness of the first slice.

In operation, the food stuff is placed upon the table 4 with one end protruding beyond the frame 1 and against the gage 19. The frame 8 having been previously elevated or raised so as to position the apexes of the knives above the food on the table and by moving the frame 8 downwardly, the knives sever the food into slices of corresponding thicknesses, therefore it will be seen that a device has been provided wherein bread, cheese, bologna or the like may be readily sliced with comparatively great ease and that the knife blades will create clean cuts through the food so as not to create ragged edges to the food or slices.

Referring to my modified form of invention, the same consists of a substantially rectangular frame 20 having corner posts 21 that are provided with slots or guides 22 for slidably supporting knife supporting frames 23. The frames 23 are connected at their upper ends by a bar or handle 24 whereby said frames may be easily raised and lowered. The frames 23 are normally urged upwardly by springs 25 positioned within the guides or slots 22 and engage the lower ends of the side members of said frames. The frames 23 are connected by pairs of rods 26 that extend through the slots of the posts 21 and also extend through the heads 27 of a series of knife blades 28 of a corresponding construction to the knife blades employed in my preferred form of invention. The heads 27 extend through slots 29 in spacing elements 30 and are connected by tie rods 31. The supporting rods 26 are provided with removable nuts so that said rods may be removed from the groups of knife blades and also the knife supporting frame when desired.

A food supporting rack 32 is carried by the supporting frame 1 under the knife blades 28 by inclined braces 33 secured to the supporting frame and consist of converging boards 34 slidably mounted on pins 35 carried by the braces 33. Springs 36 are mounted on the pins 35 between the braces 33 and the boards for yieldably supporting said boards and which will permit slight giving of the food supported by the rack when the knife blades first engage the same. In some instances, the food supported by the rack 32 may have a hard or soggy crust which is difficult to penetrate by the knife blades and the rack 32 being yieldably supported will permit the food to move slightly when first engaged by the knife blades so as to prevent abrupt stopping of the knife blades in a downward direction when first engaging the hard or soggy crust.

A gage 37 is carried by the rack 32 at one end and is adjustable so that the first slice cut from the food may be of the same thickness as the remaining slices by adjusting the gage properly.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A slicing device comprising a food supporting means, a knife frame slidably mounted on said means, supporting rods carried by said frame, a plurality of substantially triangular shaped knife blades mounted on said rods, spacing elements having relatively spaced slots receiving the knives to hold said knives in spaced relation, and tie means for said knives.

2. A slicing device comprising a frame of substantially rectangular shape and including corner posts having guides, knife frames slidably mounted in said guides, springs mounted in said guides for urging the knife frames upwardly, a food rack carried by said frame, and a series of knives carried by the knife frames and disposed over the food rack.

3. A slicing device comprising a frame, knife frames slidably mounted on said first frame, rods connecting the knife frames, a series of knives carried by said rods, a handle connecting the knife frame and disposed over the first named frame, and a yieldable rack carried by the first frame and disposed under the knives.

4. A slicing device comprising a frame, knife frames slidably mounted on the first frame, a series of knives carried by the knife frames, converging braces carried by the first frame, converging food supporting boards yieldably carried by said braces and adapted to form a food rack under the knives, and a gage secured to the rack.

In testimony whereof I affix my signature in presence of two witnesses.

GUSTAF E. SANDBECK.

Witnesses:
JOHN A. ORR,
GEORGE W. CHANDLER.